(12) United States Patent
Got et al.

(10) Patent No.: US 6,281,602 B1
(45) Date of Patent: Aug. 28, 2001

(54) BACKUP BATTERY RECHARGE CONTROLLER FOR A TELECOMMUNICATIONS POWER SYSTEM

(75) Inventors: Pierre Got; Christian de Varennes, both of Montreal (CA)

(73) Assignee: Astec International Limited, Kowloon (HK)

( * ) Notice: Subject to any disclaimer, the term of this patent is extended or adjusted under 35 U.S.C. 154(b) by 0 days.

(21) Appl. No.: 09/586,293

(22) Filed: Jun. 2, 2000

(51) Int. Cl.[7] ........................................ H02J 7/00
(52) U.S. Cl. ............................ 307/66; 307/18; 320/123
(58) Field of Search ................................. 363/50, 52, 81; 307/18, 21, 22, 23, 25, 26, 46, 48, 64, 65, 66, 80, 85; 320/118, 123, 128, 134

(56) References Cited

U.S. PATENT DOCUMENTS

| | | | |
|---|---|---|---|
| 5,332,297 | * 7/1994 | Paul et al. | 307/66 |
| 5,563,802 | * 10/1996 | Plahn et al. | 364/492 |
| 5,642,100 | * 6/1997 | Farmer | 340/636 |
| 6,169,384 | * 1/2001 | Shannon | 320/107 |
| 6,201,371 | * 3/2001 | Kawabe et al. | 320/121 |

* cited by examiner

*Primary Examiner*—Matthew Nguyen
(74) *Attorney, Agent, or Firm*—Harness, Dickey & Pierce, P.L.C.

(57) ABSTRACT

A telecommunications power system according to the invention includes a power bus and a plurality of batteries that are connected to the power bus. A distribution module is connected to the power bus. A plurality of loads are connected to the distribution module. A plurality of rectifier modules are connected to the power bus and at least one AC power source. A generator provides backup AC power to the rectifier modules when the AC power source is interrupted. A controller is connected to the rectifier modules and the generator. A controller includes a battery recharging control module that allows the user to select a first mode of operation that allows the generator to recharge the battery when the generator provides the backup AC power. A second mode of operation prevents the batteries from recharging when the generator provides the backup AC power. A third mode of operation decreases current provided by the generator to charge the batteries when the generator is in an overload state until the overload state ends. A fourth mode of operation prevents battery charging when the generator is in the overload state.

28 Claims, 5 Drawing Sheets

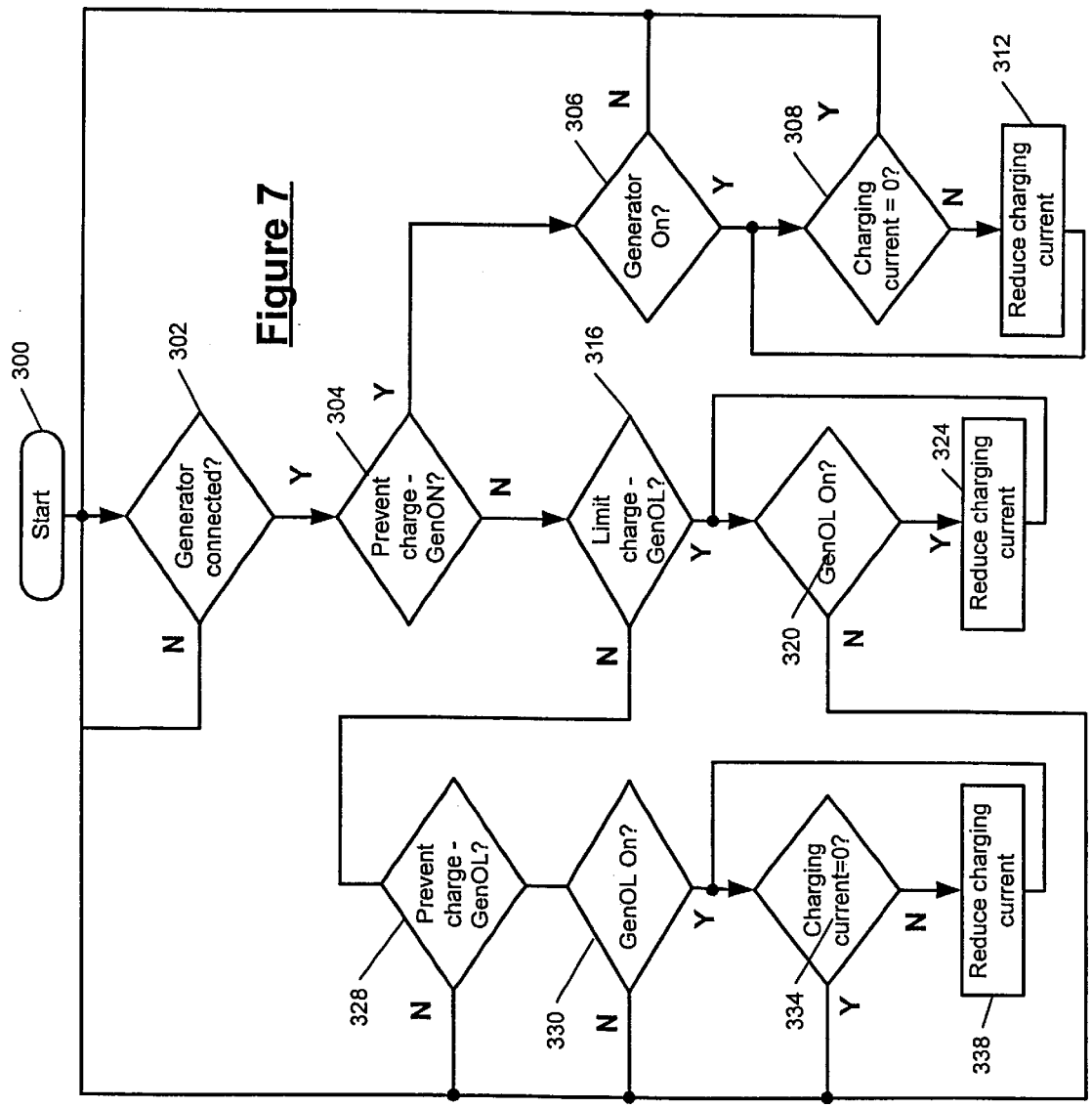

US 6,281,602 B1

BACKUP BATTERY RECHARGE CONTROLLER FOR A TELECOMMUNICATIONS POWER SYSTEM

TECHNICAL FIELD OF THE INVENTION

This invention relates to telecommunications power systems. More particularly, this invention relates to the recharging of backup batteries in a telecommunications power system that is connected to a generator.

BACKGROUND AND SUMMARY OF THE INVENTION

Telecommunications power systems generally employ rectifiers that generate a direct current (DC) voltage from an alternating current (AC) power source. Distribution modules include circuit breakers that connect the rectifiers to loads and that distribute current to the loads. The loads in a telecommunications power system typically include telephone switches, cellular equipment, routers and other associated equipment. In the event that AC power is lost, the telecommunications power systems initially rely on backup batteries to provide power and to prevent costly down time. Generators are typically used for longer outages. Telephone switches, cellular equipment and routers normally carry thousands of calls and/or data streams that will be interrupted if power is lost causing a significant loss of revenue.

The backup batteries provide power for a predetermined backup period. The number and size of the backup batteries that are required to provide power during the predetermined backup period varies depending on the number and size of the loads. The backup batteries should provide a sufficient time to allow skilled technicians to reach the site, to troubleshoot and to fix the problem or to connect a backup generator. Some systems use backup batteries until a generator that provides backup AC power is started to temporarily provide power when the AC power source is lost. While AC power is out, the generator provides power for the loads and charges the back up batteries. As a margin of safety, the capacity of the generator is generally 20% larger than the maximum power required to supply the loads and to charge the backup batteries. As can be appreciated, the cost of the generator increases significantly as capacity increases.

In an effort to limit the size of the backup generator to reduce the cost of the telecommunications power system, some operators separate the DC power bus into first and second sections. A contactor provides a connection between the first and second sections of the DC power bus and is normally closed. When AC power is lost, the contactor is opened. A generator that is connected to the first section provides power to the loads but does not charge the backup batteries. When the AC power source returns, the generator shuts down or is placed in a standby mode. The contactor is closed and the system returns to normal operation.

Other systems that employ the split DC power bus with the first and second sections do not use the contactor between the first and second sections. In these systems, the rectifiers that charge the backup batteries are not available for load sharing and temperature stress distribution during normal operation.

A telecommunications power system according to the invention includes a power bus and a plurality of batteries that are connected to the power bus. A distribution module is connected to the power bus. A plurality of loads are connected to the distribution module. A plurality of rectifier modules are connected to the power bus and at least one AC power source. A generator provides backup AC power to the rectifier modules when the AC power source is interrupted. A controller is connected to the rectifier modules and the generator. The controller includes a battery recharge control module that allows the user to select a first mode of operation that allows the generator to recharge the backup batteries when the generator provides the backup AC power. A second mode of operation prevents the batteries from recharging when the generator provides the backup AC power. A third mode of operation decreases current provided by the generator to charge the batteries when the generator is in an overload state until the generator is not in the overload state. A fourth mode of operation prevents the batteries from recharging when the generator is in an overload state.

The backup battery recharge controller according to the invention allows the telecommunications power system operator to prevent the backup batteries from charging when the generator provides backup AC power. As a result, a smaller generator can be used to provide the backup AC power to the loads when the AC power source is interrupted. Alternately, the telecommunications power system operator can limit the amount of current supplied to the backup batteries when the generator is in an overload state. This mode of operation allows the backup batteries to charge when excess capacity is available from the generator.

BRIEF DESCRIPTION OF THE DRAWINGS

The various advantages of the present invention will become apparent to those skilled in the art after reading the following specification and by reference to the drawings in which:

FIG. 7 is a flow chart illustrating steps for controlling battery recharge according to the invention.

DETAILED DESCRIPTION OF THE PREFERRED EMBODIMENTS

The preferred embodiments herein described are not intended to be exhaustive or to limit the invention to the precise form disclosed. This description is limited to the preferred embodiment only and is intended to describe the invention to enable one of ordinary skill in the art to practice the invention.

Figure 1:
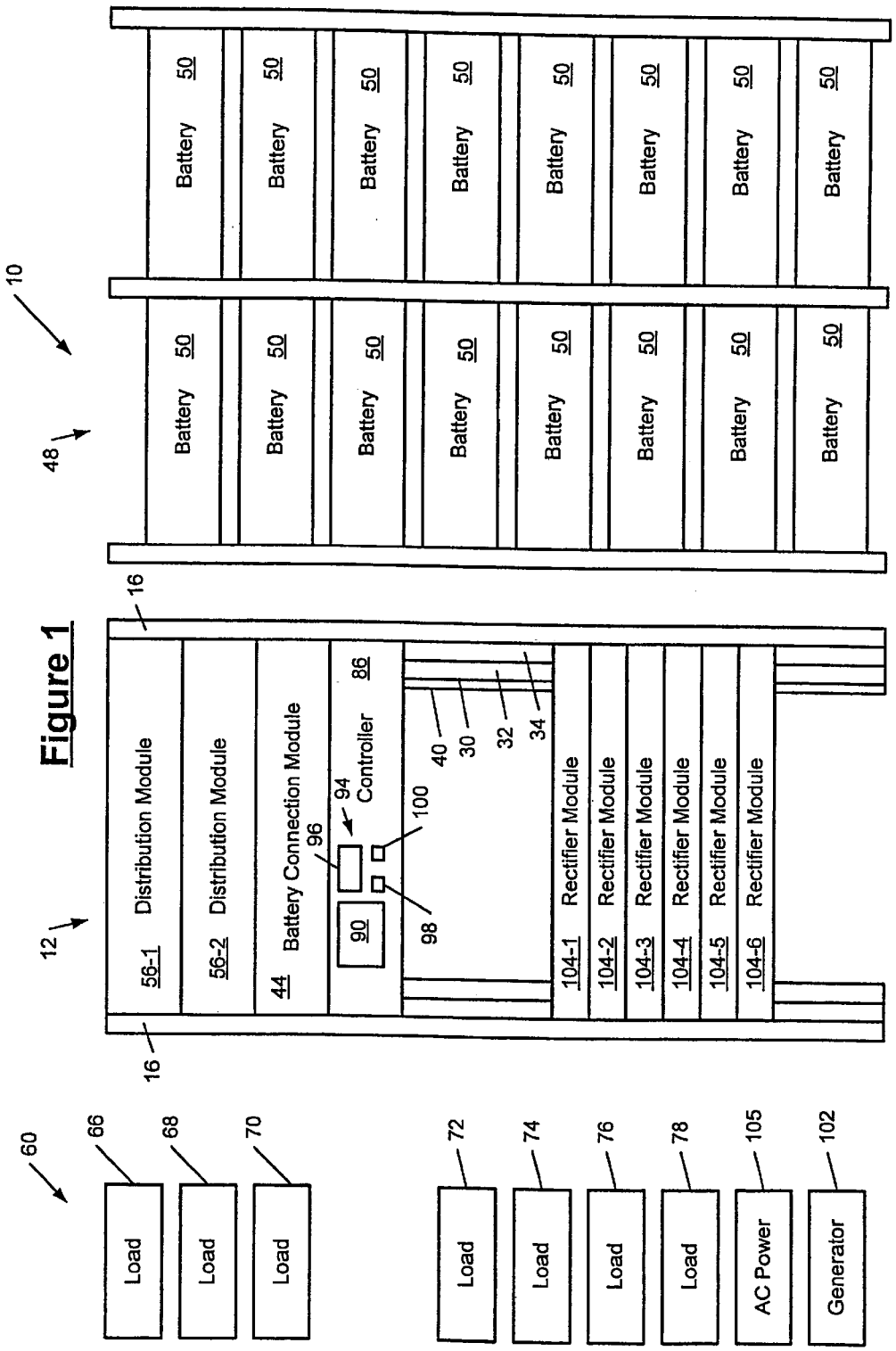
FIG. 1 is a block diagram of a telecommunications power system according to the invention that includes a frame that is connected to a plurality of loads and a battery pallet with a plurality of batteries.

Referring now to FIG. 1, a telecommunications power system 10 is illustrated and includes one or more frames 12 that include a rack 16. A direct current (DC) bus 30 includes first and second conductors 32 and 34 that extend along the rack 16 in a vertical direction and that are separated by an insulating layer (not shown). A communications bus 40 is located adjacent to the DC bus 30 and likewise includes a layer (not shown) that insulates the communications bus 40 from the first and second conductors 32 and 34.

The design of the telecommunications power system 10 is modular such that the capacity of the system 10 can be changed by adding or removing modules from the system 10. The design of the telecommunications power system 10 has been optimized through the use of modular connectors (not shown) to facilitate the connection and disconnection of the modules from the frame 12.

The telecommunications power system 10 includes one or more battery connection modules 44 that are connected to the DC bus 30 and the communications bus 40. The battery connection module 44 is connected to a pallet of backup batteries 48 that includes a plurality of battery cells 50. In a preferred embodiment, each of the battery cells provides a two volt output and a relatively high current output. The battery cells 50 are typically connected into battery strings that contain from 24 to 26 battery cells. Each battery string provides 48 VDC for telephone switch and router applications. Depending upon the length of time desired for the battery backup and the size of load to be supplied, the number and/or capacity of the backup batteries may be varied. Skilled artisans can appreciate that other voltages, string sizes and packaging arrangements can be employed for telecommunications power systems having other power requirements.

One or more distribution modules 56 are connected to the DC bus 30 and the communications bus 40. The distribution modules 56 distribute power to one or more loads 60 such as telecommunications switches, cellular equipment and routers. For example in FIG. 1, the distribution module 56-1 delivers power to loads 66, 68 and 70. The distribution module 56-2 delivers power to loads 72, 74, 76, and 78. The number of distribution modules depends on the size and number of the loads that are associated with the telecommunications power system 10.

A master controller 86 is connected to the DC power bus 30 and to the communications bus 40. The master controller 86 includes a display 90 and an input device 94 which preferably includes a touch pad 96 and buttons 98 and 100. An alternate display can be a computer monitor. The input device 94 and the display 90 can be combined in a touch screen display. A keyboard and/or a mouse may also be employed. The master controller 86 preferably provides an internet browser-like interface that is navigated using the touch pad 96 in a conventional point-and-click manner or using the touch pad 96 and the buttons 98 and 100. Alternately, text-based and/or menu-driven interfaces can be provided.

The telecommunications power system 10 further includes one or more rectifier modules 104 that are connected to the DC bus 30 and the communications bus 40. A generator 102 is connected to the same point as the AC power source 105 that supplies the rectifier modules 104. The AC power source 105 is connected to the rectifier modules using circuit breakers 107. The generator 102 provides backup AC power when required in a conventional manner. In addition, the generator 102 provides a first control signal to the controller 86 or the communications bus 40 that identifies when the generator 102 is on. The generator 102 provides a second control signal when the generator 102 is in an overload state. The generator 102 may only provide a "generator on" signal or a "generator overload" signal or both signals. The generator 102 can be dedicated to the telecommunications power system 10 or be added to the telecommunications power system 10 on an as-needed basis. Connections between the loads, the generator, and the backup batteries have been omitted in FIG. 1 for purposes of clarity.

Using the input device 94, the telecommunications system operator defines the operation of the system 10 when the generator 102 is provided. When the telecommunications system operator selects a first operational mode, the system 10 operates normally. The generator 102 powers the loads and charges the batteries if needed when the AC power source is lost. When the telecommunications operator selects a second operational mode, the controller 86 prevents the backup batteries from charging when the generator is on. When the telecommunications operator selects a third operational mode, the controller 86 decreases current that is available for charging the backup batteries if the generator is in an overload state current is limited until the generator is no longer in the overload state and remains at this limit until AC power returns. When the telecommunications operator selects a fourth operational mode, the controller 86 prevents the backup batteries from changing when the generator is in the overload state until the AC power returns.

Figure 2:
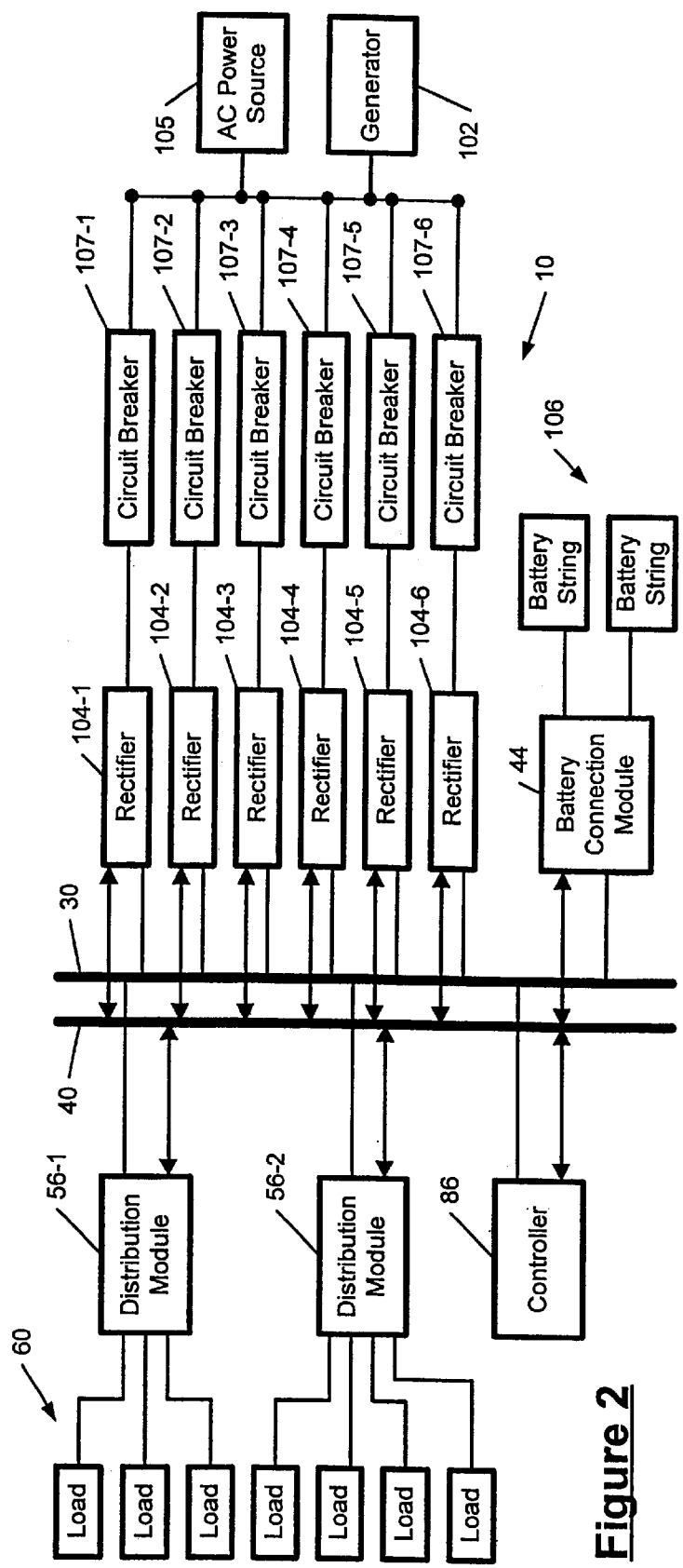
FIG. 2 is a functional block diagram of the telecommunications power system of FIG. 1.

Referring now to FIG. 2, the telecommunications power system of FIG. 1 is illustrated in further detail. In use, one or more AC power sources 105 provide voltage that is typically between 80 and 300 VAC at a frequency between 45 and 65 Hz. The rectifier modules 104 rectify the AC voltage provided by the AC sources 105. The rectifier modules 104 provide a controllable output voltage and current and are rated at 48 volts nominal and 50 or 200 amps. Skilled artisans can appreciate that other rectifier voltage and current outputs can be provided depending upon the requirements of the telecommunications power system.

Depending upon the type of backup batteries employed, the output voltage of the rectifier modules 104 will be set higher than 48 volts. Typically, the rectifier modules 104 operate at a float voltage of the backup batteries during normal operation so that the backup batteries do not discharge current. The backup batteries are typically connected in battery strings 106 containing 24 to 26 battery cells. The float voltage is typically set between 52 and 54 VDC depending upon the characteristics of the backup batteries.

The rectifier modules 104 preferably include a shunt, sensing leads, and an analog to digital (A/D) converter for sensing rectifier voltage and current. The rectifier module 104 transmits digital signals representing the rectifier voltage and current (in addition to other digital control and communications signals) to the controller 86 via the communications bus 40. Likewise, the battery control modules 44 and the distribution modules 56 include a shunt, sensing leads, and an analog-to-digital converter for sensing battery and load voltages and currents. Preferably, the controller 86 employs a serial communications protocol that is insensitive to noise. In a preferred embodiment, the communications system employs serial communications using a CAN protocol such as CAN version 2.0B.

The distribution modules 56 include one or more circuit breakers (not shown) which are preferably modular plug-in type circuit breakers to facilitate connection and disconnection of the loads 60. The distribution module 56 connects the loads 60 to the DC power bus 30.

The signal output of the generator 102 can be connected by an input/output (I/O) interface (not shown) to the communications bus 40. The I/O interface ensures that the "generator on" signal and the "generator overload" signal comply with the CAN protocol. Alternately, the signal outputs of the generator 102 can be connected directly to one or more logical inputs of the controller 86 or to one or more neurons that are associated with the modules.

Figure 3:
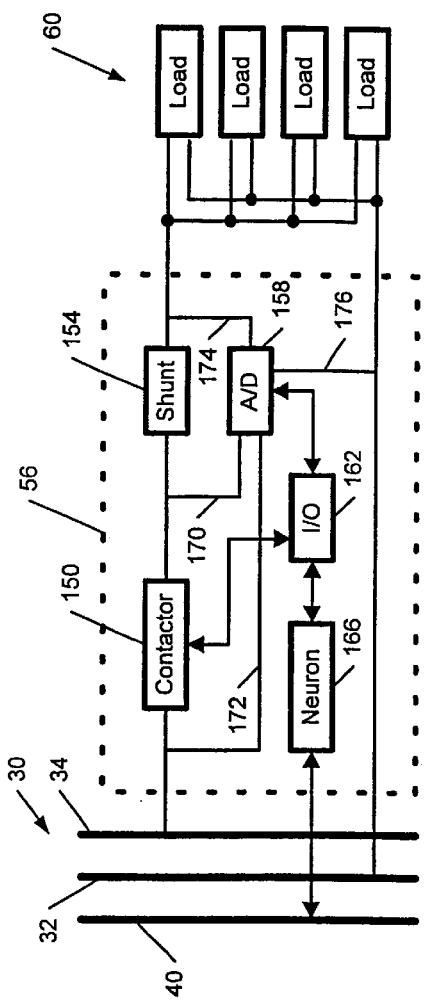
FIG. 3 is a functional block diagram of the distribution module of FIG. 1 in further detail.

Referring now to FIG. 3, the distribution module 56 is illustrated in further detail. The distribution module 56 includes one or more circuit breakers (not shown) that are located between the loads 60 and the DC bus 30. The distribution module 56 includes a contactor 150, a shunt 154, an A/D converter 158, an I/O interface 162, and a neuron 166. The contactor 150 is controlled by the neuron 166 through the I/O interface 162. The contactor 150 connects and disconnects the loads 60 and is provided if the telecommunications system operator desires load disconnection. Because contactors are a single point of failure, some system operators opt for battery disconnection instead of load disconnection. When the contactor 150 fails, power to the loads is interrupted. When battery disconnection is used, the load is not interrupted when a battery disconnect contactor (see FIG. 5) fails. Both types of disconnection may be employed if desired.

The neuron 166 is preferably a controller that includes a processor and memory (not shown). The neuron 166 performs local processing for the distribution module 56 and I/O communications between the distribution module 56, the master controller 86, and other modules in the telecommunications power system 10. The I/O module 162 is connected to the neuron 166 and to the A/D converter 158. The A/D converter 158 includes sensing leads 170 and 172 that sense a voltage across the contactor 150. The sensing lead 170 and sensing lead 174 sense a voltage across the shunt 154 so that a load current can be calculated. The sensing leads 174 and 176 sense a voltage output across the loads 60.

Figure 4:
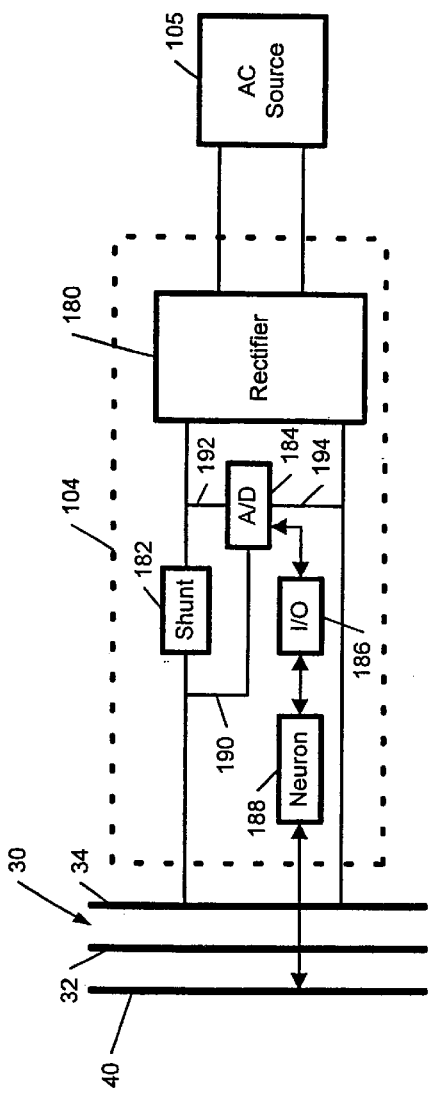
FIG. 4 is a functional block diagram of the rectifier module of FIG. 1 in further detail.

Referring now to FIG. 4, the rectifier modules 104 are illustrated in further detail and include a rectifier 180, a shunt 182, an A/D converter 184, an I/O interface 186, and a neuron 188. The neuron 188 performs local processing functions for the rectifier module 104 and controls I/O communications between the rectifier module 104, the master controller 86 and other modules in the telecommunications power system 10. The A/D converter 184 includes sensing leads 190, 192, and 194. The A/D converter 184 senses a rectifier voltage using the sensing leads 192 and 194 and a rectifier current by sensing a voltage across the shunt 182 using leads 190 and 192.

Figure 5:
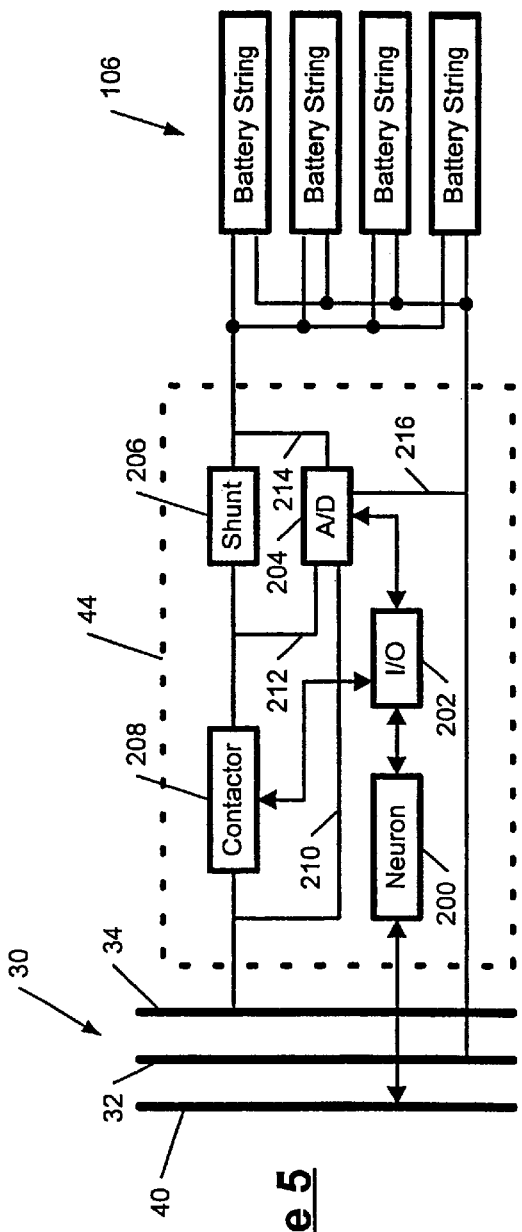
FIG. 5 is a functional block diagram of the battery connection module of FIG. 1 in further detail.

Referring now to FIG. 5, the battery connection module 44 is illustrated and includes a neuron 200, an I/O interface 202, an A/D converter 204, a shunt 206 and a contactor 208. The neuron 200 performs local processing functions and I/O communications between the battery connection module 44, the master controller 86 and other modules in the telecommunications power system 10. The contactor 208 is controlled by the neuron 200 through the I/O interface 202. The A/D converter 204 includes sensing leads 210, 212, 214, and 216. The A/D converter 204 senses a battery voltage using the leads 214 and 216. The A/D converter 204 senses a battery current by sensing a voltage drop across the shunt 206 using the leads 212 and 214. The A/D converter 204 senses a voltage across the contactor 208 using the leads 210 and 212.

Figure 6:
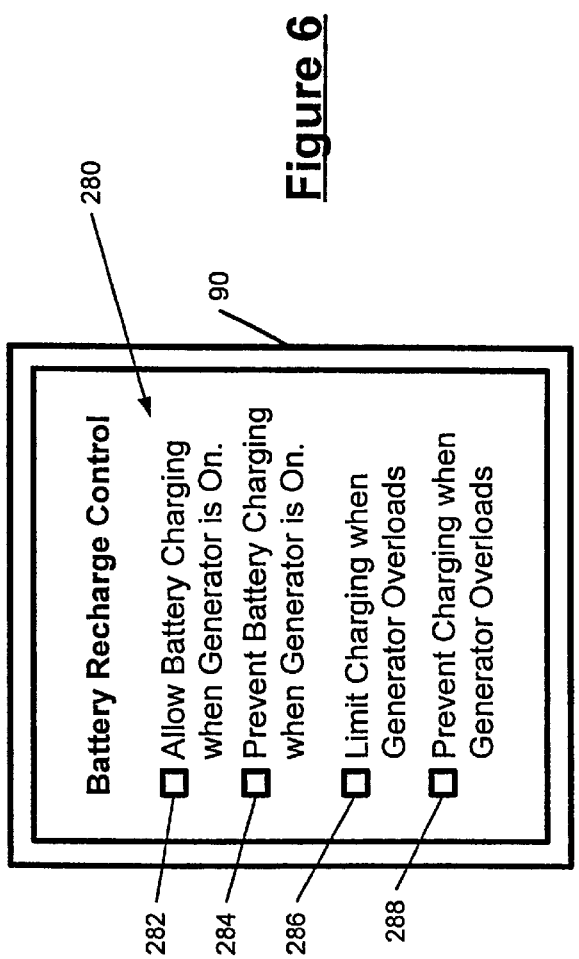
FIG. 6 illustrates the display associated with the controller.

Referring now to FIG. 6, the display 90 that is associated with the master controller 86 is shown. In addition to other screens, the display 90 provides an interface screen 280 for setting the first, second, third and fourth operational modes for the telecommunications power system 10 when the telecommunications power system 10 is connected to the generator 102. The interface screen 280 preferably includes first, second, third and fourth check boxes 282, 284, 286 and 288. The check box 282 allows the operator to select the first operational mode which allows the backup batteries to be charged when the generator 102 is connected to the telecommunications power system 10. The check box 282 can be omitted if desired and the first operational mode can be set as a default mode.

The check box 284 allows the operator to select the second operational mode which prevents the backup batteries from charging when the generator 102 is on. The check box 286 allows the operator to select the third operational mode which decreases the current for charging the backup batteries when the generator 102 is in an overload operational state. The current provided to the batteries is reduced until the generator is no longer in the overload operational state. The check box 288 allows the operator to select the fourth mode which prevents battery charging when the generator 102 is in an overload operational state. The check boxes 282, 284, 286, and 288 are preferably mutually exclusive. If one of the check boxes 282, 284, 286, and 288 is selected, the others are deselected. Skilled artisans can appreciate that a text-based interface, a menu-driven interface, and/or switches can be used instead of the check boxes.

Referring now to FIG. 7, the steps for controlling battery recharge when the generator 102 is connected to the telecommunications power system 10 is illustrated. Control begins at step 300. At step 302, control determines if the generator 102 is connected to the telecommunications power system 10. If not, control loops back to step 302. Otherwise, control continues with step 304 where control determines whether the operator selected the second operational mode (to prevent charging of the backup batteries when the generator 102 is on). If the operator selected the second operational mode, control continues with step 306 where control determines whether the generator 102 is on. If not, control loops to step 302. Otherwise, control continues with step 308 where control determines whether the current output to the backup batteries equals zero. If it does, control loops to step 302. Otherwise, control continues with step 312 where control reduces the charging current. Then, control loops to step 308.

Control continues with step 316 (from step 304 when the operator does not select the second operational mode) where control determines if the operator selected the third operational mode (to decrease charging of the backup batteries when the generator 102 is in an overload operational state until the generator is not in the overload state). Control determines whether the generator 102 is in the overload operational state as determined at step 320. If not, control continues with step 328. Otherwise, control reduces the current supplied to the backup batteries in step 324 and continues with step 320.

If the third mode is not selected as determined in step 316, control continues with step 328 where control determines if the fourth mode is selected. If not, control continues with step 302. Otherwise, control determines whether the generator 102 is in the overload operational state at step 330. If not, control returns to step 302. Otherwise control determines whether the charging current of the batteries is zero in step 334. If not, control reduces battery charging current in step 338 and returns to step 334.

While the backup battery charging current is set to zero when the second and fourth operational modes are selected, the actual current will be slightly greater than zero to prevent battery discharge. The amount of current flow will also depend on the accuracy of current measurement in the telecommunications power system 10.

To control charging to the backup batteries, the current output of the rectifier modules 104 is measured and added together. A current limit of the rectifier modules is adjusted to set the proper rectifier current level. For example, with three rectifier modules and a load current of 100A, the current limit of the rectifier modules is set to 33A plus an additional slight amount of current to ensure that the batteries do not discharge. The slight amount of additional current will depend on current regulation and system measuring tolerances. Alternately, the voltage output of the rectifier modules is set slightly above the output voltage of the backup batteries. When AC power returns, a transfer switch that is associated with the generator places the generator in a standby mode for a predetermined period in case the AC power is lost or shuts the generator down.

As can be appreciated from the foregoing, the battery recharge controller according to the present invention eliminates the need for a contactor or a split DC power bus. Since contactors are a single point of failure, the elimination of the contactor improves the reliability of the telecommunications power system. If the contactor fails during use, the batteries will not recharge when AC power returns to the telecommunications power system after a failure. Subsequent loss of AC power may result in significant loss of service because the batteries will not be charged. In addition, the size of the generator can be tailored more specifically to the application. Since the generator will not necessarily need to supply the backup batteries while supplying the loads, a smaller and lower cost generator can be employed.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A telecommunications power system, comprising:
    a power bus;
    a plurality of batteries that are connected to said power bus;
    a distribution module that is connected to said power bus;
    a plurality of loads that are connected to said distribution module;
    a plurality of rectifier modules that are connected to said power bus and at least one AC power source;
    a generator that provides backup AC power to said rectifier modules when said AC power source is interrupted; and
    a controller that is connected to said rectifier modules and said generator, wherein said controller includes a battery recharging control module that allows a user to select a first mode of operation that allows said generator to recharge said batteries when said generator provides said backup AC power and a second mode of operation that prevents said batteries from recharging when said generator provides said backup AC power.

2. The telecommunications power system of claim 1 wherein said controller is a master controller.

3. The telecommunications power system of claim 1 wherein said controller is a neuron that is associated with a module.

4. The telecommunications power system of claim 1 wherein said generator provides generator state signals that identify a "generator on" state and a "generator overload" state.

5. The telecommunications power system of claim 4 wherein said controller allows a user to select a third mode of operation that decreases current provided by said generator to charge said batteries when said generator is in an overload state until said overload state ends.

6. The telecommunications power system of claim 5 wherein said controller allows a user to select a fourth mode of operation that prevents said batteries from recharging when said generator is in an overload state.

7. A telecommunications power system, comprising:
    a power bus;
    a plurality of batteries that are connected to said power bus;
    a distribution module that is connected to said power bus;
    a plurality of loads that are connected to said distribution module;
    a plurality of rectifier modules that are connected to said power bus and at least one AC power source;
    a generator that provides backup AC power to said rectifier modules when said AC power source is interrupted; and
    a controller that is connected to said rectifier modules and said generator, wherein said controller includes a battery recharging control module that allows a user to select a first mode of operation that allows said generator to recharge said batteries when said generator provides said backup AC power and a second mode of operation that decreases current provided to charge said batteries when said generator is in an overload state until said overload state ends.

8. The telecommunications power system of claim 7 wherein said controller is a master controller.

9. The telecommunications power system of claim 8 wherein said controller is a neuron that is associated with a module.

10. The telecommunications power system of claim 7 wherein said generator provides generator state signals that identify "generator on" and "generator overload" states.

11. The telecommunications power system of claim 10 wherein said master controller allows a user to select a third mode of operation that prevents said batteries from recharging when said generator provides said backup AC power.

12. The telecommunications power system of claim 10 wherein said controller allows a user to select a fourth mode of operation that prevents said batteries from recharging when said generator is said "generator overload" state.

13. A method of operating a telecommunications power system that includes a power bus, a plurality of batteries that are connected to said power bus, a distribution module that is connected to said power bus, a plurality of loads that are connected to said distribution module, a plurality of rectifier modules that are connected to said power bus and at least one AC power source, a generator that provides backup AC power to said rectifier modules when said AC power source is interrupted, and a controller that is connected to said rectifier modules and said generator, comprising the steps of:
    providing an operator interface that allows a user to select between first and second modes of operation;
    recharging said batteries with said generator when said generator provides said backup AC power and said first mode is selected; and
    preventing said generator from recharging said batteries when said generator provides said backup AC power and said second mode is selected.

14. The method of claim 13 further comprising the steps of:

transmitting a generator state signal to said controller that identifies when said generator is on.

15. The method of claim 13 further comprising the steps of:

transmitting a generator overload signal to said controller when said generator is in an overload state.

16. The method of claim 15 wherein said operator interface allows the user to select a third mode of operation.

17. The method of claim 16 further comprising the step of:

decreasing current provided by said generator for charging said batteries when said third mode is selected and said generator is in said overload state until said overload state ends.

18. The method of claim 15 wherein said operator interface allows the user to select a fourth mode of operation.

19. The method of claim 18 further comprising the steps of:

preventing said generator from recharging said batteries when said generator is in said overload state and said fourth mode is selected.

20. A method of operating a telecommunications power system that includes a power bus, a plurality of batteries that are connected to said power bus, a distribution module that is connected to said power bus, a plurality of loads that are connected to said distribution module, a plurality of rectifier modules that are connected to said power bus and at least one AC power source, a generator that provides backup AC power to said rectifier modules when said AC power source is lost, and a controller that is connected to said rectifier modules and said generator, comprising the steps of:

providing an operator interface that allows a user to select between first and second modes of operation;

recharging said batteries with said generator when said generator provides said backup AC power and said first mode is selected; and reducing current provided by said generator for charging said batteries when said generator is in an overload state and said second mode is selected until said overload state ends.

21. The method of claim 20 further comprising the steps of:

transmitting a generator state signal to said controller to identify that said generator is on.

22. The method of claim 21 further comprising the steps of:

transmitting a generator overload signal to said controller to identify that said generator is in an overload state.

23. The method of claim 20 wherein said operator interface allows a user to select a third mode of operation.

24. The method of claim 23 further comprising the step of:

preventing said generator from recharging said batteries when said generator provides said backup AC power and said third mode is selected.

25. The method of claim 22 wherein said operator interface allows a user to select a fourth mode of operation.

26. The method of claim 25 further comprising the steps of:

preventing said generator from recharging said batteries when said generator is in said overload state and said fourth mode is selected.

27. A telecommunications power system, comprising:

a power bus;

a plurality of batteries that are connected to said power bus;

a distribution module that is connected to said power bus;

a plurality of loads that are connected to said distribution module;

a plurality of rectifier modules that are connected to said power bus and at least one AC power source;

a generator that provides backup AC power to said rectifier modules when said AC power source is interrupted; and a controller that is connected to said rectifier modules and said generator, wherein said controller includes a battery recharging control module that allows a user to select a first mode of operation that allows said generator to recharge said batteries when said generator provides said backup AC power and a second mode of operation that prevents said batteries from recharging when said generator is in an overload state.

28. A method of operating a telecommunications power system that includes a power bus, a plurality of batteries that are connected to said power bus, a distribution module that is connected to said power bus, a plurality of loads that are connected to said distribution module, a plurality of rectifier modules that are connected to said power bus and at least one AC power source, a generator that provides backup AC power to said rectifier modules when said AC power source is lost, and a controller that is connected to said rectifier modules and said generator, comprising the steps of:

providing an operator interface that allows a user to select between first and second modes of operation;

recharging said batteries with said generator when said generator provides said backup AC power and said first mode is selected; and preventing said batteries from recharging when said generator is in an overload state and said second mode is selected.

* * * * *

UNITED STATES PATENT AND TRADEMARK OFFICE
CERTIFICATE OF CORRECTION

PATENT NO.     : 6,281,602 B1
DATED          : August 28, 2001
INVENTOR(S)    : Pierre Got et al.

It is certified that error appears in the above-identified patent and that said Letters Patent is hereby corrected as shown below:

<u>Column 8,</u>
Line 48, after "is" insert -- in --.

Signed and Sealed this

Eleventh Day of February, 2003

JAMES E. ROGAN
*Director of the United States Patent and Trademark Office*